United States Patent

Shimizu

[19]

[11] Patent Number: 4,657,103
[45] Date of Patent: Apr. 14, 1987

[54] ELECTRIC POWER STEERING SYSTEM FOR VEHICLES

[75] Inventor: Yasuo Shimizu, Tochigi, Japan

[73] Assignee: Honda Giken Kogyo Kabushiki Kaisha, Tokyo, Japan

[21] Appl. No.: 863,898

[22] Filed: May 16, 1986

[30] Foreign Application Priority Data

May 27, 1985 [JP] Japan ................... 60-113499

[51] Int. Cl.⁴ .............................................. B62D 5/08
[52] U.S. Cl. ......................................... 180/142; 180/79.1
[58] Field of Search ............... 180/142, 141, 143, 79.1

[56] References Cited

U.S. PATENT DOCUMENTS 4,522,278  6/1985  Kitagawa et al. ............... 180/79.1
4,557,342  10/1985  Drutchas ........................ 180/142
4,582,155  4/1986  Ohe ................................ 180/79.1

FOREIGN PATENT DOCUMENTS

59-70257  4/1984  Japan .

Primary Examiner—John J. Love
Assistant Examiner—Donn McGiehan
Attorney, Agent, or Firm—Armstrong, Nikaido, Marmelstein & Kubovcik

[57] ABSTRACT

An electric power steering system for vehicles (200) including a drive control circuit (30, 45, 53) for giving a drive signal (Va) to an electric motor (18) for producing auxiliary torque to be applied to an output shaft (5), taking into consideration an output signal ($S_1$, $S_2$) from a steering torque detection mechanism (31) for detecting steering torque (Ts) acting on an input shaft (4). The steering system (200) further comprises a mechanism (35) for detecting the steering speed (Ns) of the input shaft (4) and a mechanism (115, 116, 122–126, 130–132) for detecting the steering acceleration (dNs) of the input shaft (4), and the drive control circuit (30, 45, 53) is adapted to give the motor drive signal (Va) to the electric motor (18), taking into consideration an output signal ($S_3$, $S_4$) from the steering speed detecting mechanism (35) and an output signal (dNs) from the steering acceleration detecting mechanism (115, 116, 122–126, 130–132) in addition to the steering torque signal ($S_1$, $S_2$). The drive control circuit (30, 45, 53) includes a microcomputer unit (30) adapted to determine and output a control signal ($T_3$, $T_4$) constituting the basis of the motor drive signal (Va) in an address designation manner in dependence of the steering torque signal ($S_1$, $S_2$), the steering speed signal ($S_3$, $S_4$), and the steering acceleration signal (dNs).

8 Claims, 14 Drawing Figures

ELECTRIC POWER STEERING SYSTEM FOR VEHICLES

BACKGROUND OF THE INVENTION

1. Field of the Invention

The present invention generally relates to a power steering system for vehicles. More particularly, the invention relates to an electric power steering system for vehicles which produces auxiliary steering torque by means of a steering servo device using an electric motor.

2. Description of Relevant Art

In view of problems in hydraulic type power steering systems such as that the structure thereof is complicated, in recent years a variety of electric type power steering systems for vehicles have been proposed.

As one of them, an example of an analogue control type is disclosed in Japanese Patent Application Lay-Open Print No. 59-70257, laid open Apr. 20, 1984.

According to this Japanese Lay-Open Print, an electric power steering system for vehicles includes a steering servo device having as its power source an electric motor and an analogue type control circuit for controlling the servo device in dependence on a steering torque signal from a detection circuit adapted to detect steering torque acting on a steering wheel, and by making the control circuit cause the electric motor to produce auxiliary torque it is devised to render the steering force light. The analogue type control circuit is adapted to have an armature voltage PWM-controlled to be impressed to the electric motor, with such a polarity that, while the steering wheel is operated to rotate in either direction thereof, causes the electric motor to rotate in a direction corresponding to the steering direction; there being fed back a signal corresponding to an armature current.

However, not limitting to the power steering system according to the aforementioned Japanese Lay-Open Print, in electric power steering systems in general, following the rotating operation of a steering wheel, an electric motor and other rotary members cooperating therewith, such as a reduction gear for example, are caused to rotate. Therefore, in cases where the steering speed of the steering wheel is changed from high to low speed or from low to high speed within a relatively short time, there arises such a problem that the steering operation receives effects of the moment of inertia, that is, inertial torque of such rotary members as described above.

In this respect, in the power steering system according to the aforementioned Japanese Lay-Open Print, with an eye to the fact that steering torque suddenly changes when the steering wheel is suddenly steered back in a steering operation thereof in either direction, the electric motor is adapted to be braked in accordance with variations of torque. In other words, when the steering wheel is suddenly steered in opposite direction, in accordance with an associated torque variation a braking is made to the electric motor by applying thereto a pulse signal with such a polarity that causes the electric motor to rotate in a direction corresponding to the reverse steering direction. However, such pulse signals for braking the electric motor are applied thereto by making use of time intervals between the PWM-controlled signals which are impressed to the electric motor to cause a forward rotation thereof. As a result, in the power steering system according to the aforementioned Japanese Lay-Open Print it may be difficult to favorably avoid such a problem as aforementioned of effects of the moment of inertia or inertial torque of the electric motor and rotary members cooperating therewith, in addition to that there is a problem concerning the durability of electric motor and besides electric power loss is still large.

On the other hand, in recent years, due to the advantage that complicated control functions can be achieved with a relatively simple system constitution, microcomputer systems fundamentally adapted for digital signal processes tend to be utilized as control means of various working devices.

In this respect, it would be desirous to utilize a microcomputer system in the form of a control device for such steering systems as aforementioned.

However, since in general microcomputer systems are unable to concurrently read many input signals and besides are adapted to execute signal processes thereof in a sequential manner depending on a system clock pulse, in attempts to utilize a microcomputer system to achieve control functions similar to those of an analogue control circuit of a conventional electric power steering system of the type described, for example, there is an attendant restriction or problem such that a predetermined process time is required.

In this respect, in cases where a feedback control is performed by using a microcomputer system, it is needed to repeat a feedback loop so many times and such a problem as described above becomes remarkable.

For such reasons, in cases where a microcomputer system is utilized as a control device of an electric power steering system, there is an attendant possibility such that an electric motor for producing auxiliary torque can not be so controlled as to sufficiently follow up the speed of steering operation, thus resulting in the possibility of unsuccessful realization of optimum steering feeling.

In view of such a problem in conventional electric power steering systems as descrived, the present invention has been achieved to effectively solve same, and particularly, the invention has been achieved to overcome, even in cases where for the solution of such problem a microcomputer system is utilized as a control device, the aforementioned restriction or problem attending thereon.

SUMMARY OF THE INVENTION

An object of the present invention is to provide an electric power steering system for vehicles which, even in cases where the steering speed of a steering wheel is changed from high to low speed or from low to high speed within a relatively short time, possibly minimizes those effects on the steering operation which the moment of inertia or inertial torque of an electric motor and rotary members cooperating therewith, such as a reduction gear for example, otherwise would have.

Another object of the present invention is to provide an electric power steering system for vehicles which, though employing a microcomputer system in the form of a control device of such electric power steering system as described above, permits the electric motor to be so controlled as to sufficiently follow up the speed of steering operation.

To achieve such object, the present invention provides an electric power steering system for vehicles comprising an input shaft operatively connected to a steering wheel, an output shaft operatively connected to a steered wheel, an electric motor for operatively supplying auxiliary torque to the output shaft, a torque detecting means for detecting steering torque acting on the input shaft, and a drive control means for giving the electric motor a drive signal, taking into consideration an output signal from the torque detecting means, wherein the steering system further comprises a means for detecting the steering speed of the input shaft and a means for detecting the steering acceleration of the input shaft, and the drive control means is adapted to give the motor drive signal to the electric motor, taking into consideration an output signal from the steering speed detecting means and an output signal from the steering acceleration detecting means in addition to the steering torque signal.

Preferably, the drive control means comprises a microcomputer unit which, receiving the output signal from the steering torque detecting means, the output signal from the steering speed detecting means, and the output signal from the steering acceleration detecting means, determines and outputs a motor control signal representing the content of the drive signal to be given to the electric motor and a motor drive means which, receiving the motor control signal, gives the motor drive signal to the electric motor in dependence on the motor control signal, and the microcomputer unit is adapted to determine the motor control signal in an address designation manner in dependence on the respective output signals from the respective detecting means.

The above and further features, objects, and advantages of the present invention will more fully appear from the following detailed description of an exemplary embodiment of the invention when the same is read in conjunction with the accompanying drawings.

DETAILED DESCRIPTION OF THE PREFERRED EMBODIMENT

Figure 1:
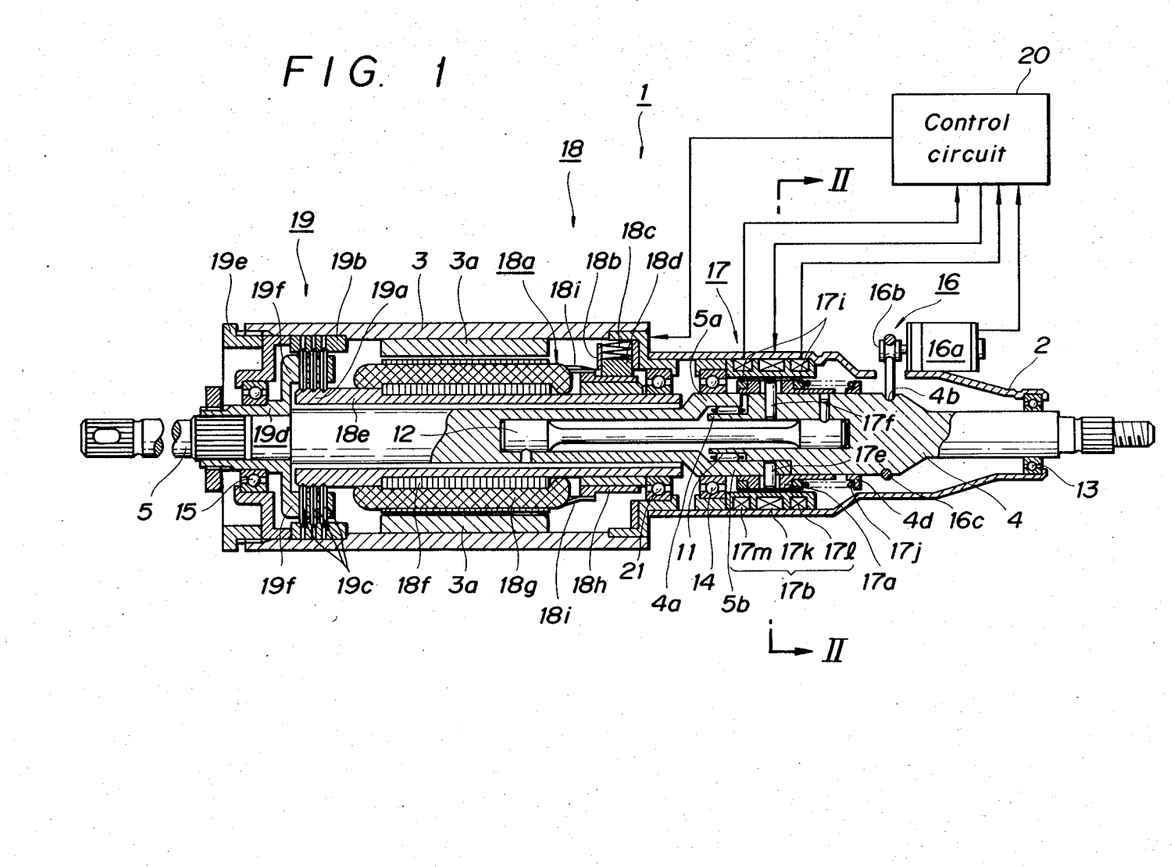
FIG. 1 is a longitudinal quarter-cutaway sectional view of an electromagnetic servo device as an essential part of an electric power steering system for vehicles according to a preferred embodiment of the present invention.

Referring first to FIG. 1, designated at reference numeral 1 is an electromagnetic servo device as an essential part of an electric power steering system 200 (FIG. 10) for vehicles according to a preferred embodiment of the present invention. In the Figure, the electromagnetic servo device 1 is shown by a longitudinal quarter-cutaway section thereof as developed at 90° about the longitudinal centerline. Designated at reference numeral 2 is a steering column, 3 is a stator, and 4 and 5 are input and output shafts disposed coaxial with each other.

Figures 2A, 2B, 2C, 10, 11:
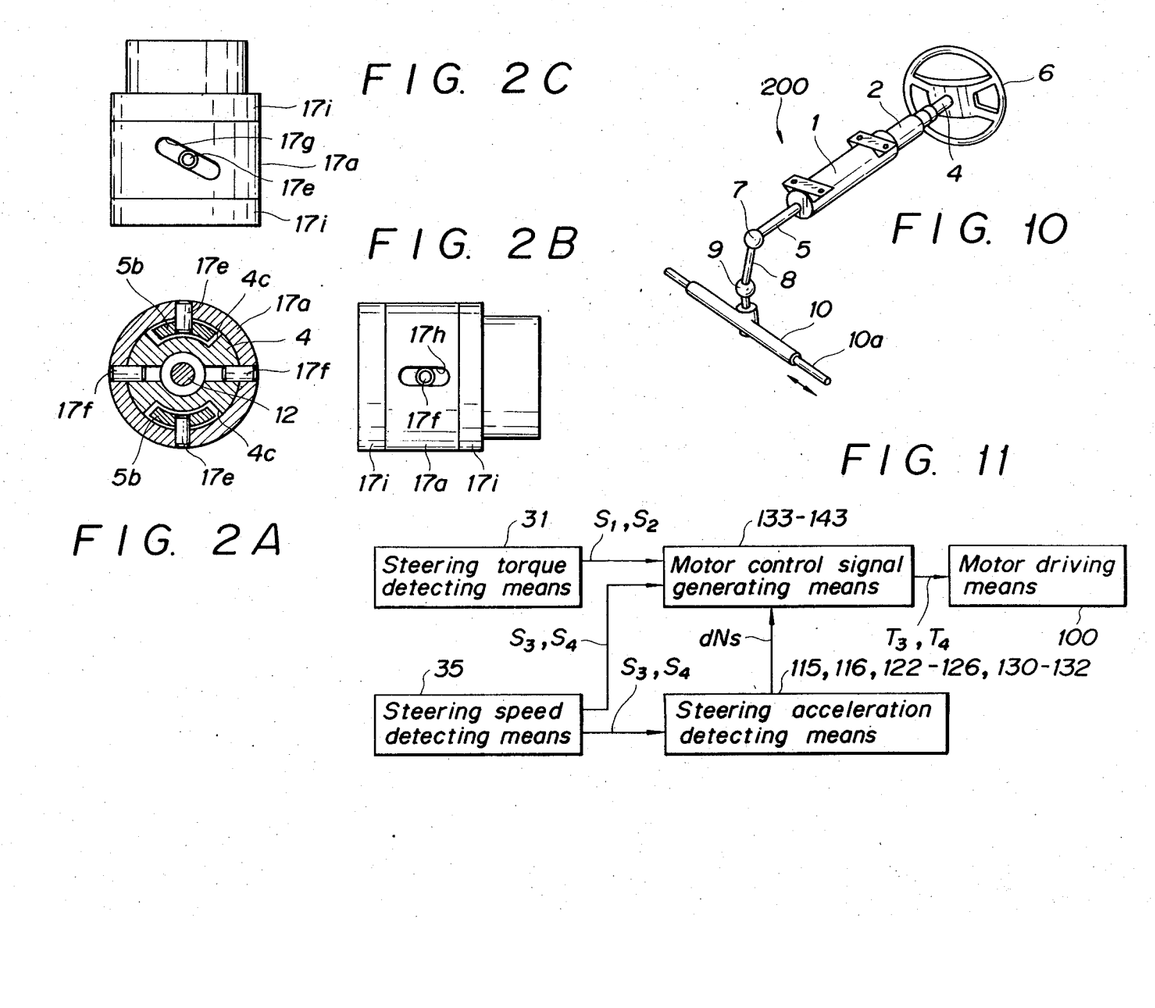
FIG. 2A is a cross-sectional view showing a mobile ferrous member of a steering torque sensor in the electromagnetic servo device, along line II—II of FIG. 1.
FIGS. 2B and 2C are side and top views of the mobile ferrous member of FIG. 2A, respectively.
FIG. 10 is a schematic perspective view of the electric power steering system for vehicles.
FIG. 11 is a schematic functional block diagram of the control circuit of FIG. 3.

As shown in FIG. 10, the input shaft 4 of the electromagnetic servo device 1 is connected at the outer end thereof to a steering wheel 6, and the output shaft 5 at the outer end thereof to a universal joint 7 which is interconnected by an intermediate shaft 8 and another universal joint 9 with a rack and pinion mechanism 10. The rack and pinion mechanism 10 includes a rack 10a connected to steered wheels (not shown). In the steering system 200 with such arrangement, the rotating steering operation of the steering wheel 6 is converted into a linear motion of the rack 10a, thereby turning the steered wheels.

Further, as shown in FIG. 1, the input shaft 4 has a diameter-reduced inner end part 4a engaged to be fitted in a diameter-enlarged inner end part 5a of the output shaft 5, the former 4a being rotatably supported by a bearing 11 in the latter 5a. The input and output shafts 4, 5 are interconnected with each other by means of a torsion bar 12 arranged coaxial with both of them. Moreover, the input shaft 4 is rotatably supported by a bearing 13 to the steering column 2, and the output shaft 5 by a pair of bearings 14, 15 to the steering column 2 and the stator 3, respectively.

The electromagnetic servo device 1 further comprises a steering rotation speed sensor 20 arranged around the input shaft 4, a steering torque sensor 24 arranged around the mutual engagement portion of the input and output shafts 4, 5, an electric motor 18 and a reduction gear 19 both arranged around the output shaft 5, and a control circuit 20 for driving to control the electric motor 18 in dependence on respective detection signals from the steering speed sensor 16 and the steering torque sensor 17.

The steering speed sensor 16 comprises a direct-current generator 16a fixed to the outer circumference of the steering column 2. The generator 16a includes a rotative shaft arranged parallel to the axis of the input shaft 4 and, on the other hand, the input shaft 4 has along the outer circumference of a large-diameter portion thereof a belt groove 4b formed therein at a position corresponding to a small-diameter pulley 16b fixed to one end of the rotative shaft. Over the belt groove 4b and the pulley 16b there is stretched a belt 16c. Thus, with rotation of the input shaft 4b, the rotative shaft of the generator 16a is caused to rotate, whereby a pair of later-described signals are output from the generator 16a in dependence on the direction and speed of rotation of the input shaft 4.

The steering torque sensor 17 comprises a differential transformer consisting of a tubular mobile ferrous member 17a axially slidably fitted on the outer circumference of the mutual engagement portion of the input and output shafts 4, 5 and a coil portion 17a fixed to the inner circumference of the steering column 2.

As shown in FIG. 2A, the input shaft 4 has formed in the outer circumference thereof a pair of axially extending slots 4c circumferentially spaced apart at 180° from each other and, on the other hand, the output shaft 5 has a pair of projections 5b axially projected from the diameter-enlarged inner end part 5a at positions corresponding to the slots 4c, which projections 5b are inserted into the slots 4c, with predetermined gaps provided therebetween, respectively.

Further, as shown in FIGS. 2A to 2C, the mobile ferrous member 17a has elongate holes 17g and 17h formed therethrough, in which a pair of radially outwardly extending pins 17e projected from the projections 5b respectively and another pair of radially outwardly extending pins 17f projected from the input shaft 4 at circumferentially 90° displaced positions with respect to the pins 17e respectively are engaged, respectively. The elongate holes 17g are inclined at a necessary angle relative to the axial direction, while the elongate holes 17h are formed in parallel with the axial direction. As a result, when, though steering torque acting on the input shaft 4 is transmitted through the torsion bar 12 to the output shaft 5, because a larger load than the steering torque is imposed at the end of the output shaft 5 a circumferential relative angular difference is developed between the input shaft 4 and the output shaft 5, accompanying a distortion of the torsion bar 12, then the mobile ferrous member 17a is forced to move in the axial direction. In other words, in correspondence to steering torque acting on the input shaft 4, the ferrous member 17a is axially displaced. The member 17a is made of a magnetic material at an axially intermediate portion thereof and has integrally formed non-magnetic parts 17i, 17i at both ends thereof. Moreover, as shown in FIG. 1, between the right end of the mobile ferrous member 17a and a stop flange 4d fixed on the input shaft 4 there is interposed a compressed spring 17j made of a non-magnetic material, thereby urging the member 17a in the leftward direction, whereby such lost motion that otherwise might be caused by those clearances between the pins 17e, 17f and the elongate holes 17g, 17h which are due to errors in manufacture is prevented.

The coil portion 17b is disposed around the mobile ferrous member 17a and comprises a primary coil 17k to which a pulse-like alternating-current signal is input and a pair of secondary coils 17l, 17m which are disposed at both sides of the primary coil 17k and adapted to output a pair of signals corresponding to the axial displacement of the ferrous member 17a.

Thus, at the steering torque sensor 17 with such constitution as described, any circumferential relative angular difference between the input and output shafts 4, 5 that follows a steering operation of the steering wheel 6 is converted into an axial displacement of the mobile ferrous member 17a, to be electrically output as the respective signals from the secondary coils 17l, 17m.

Figure 3:
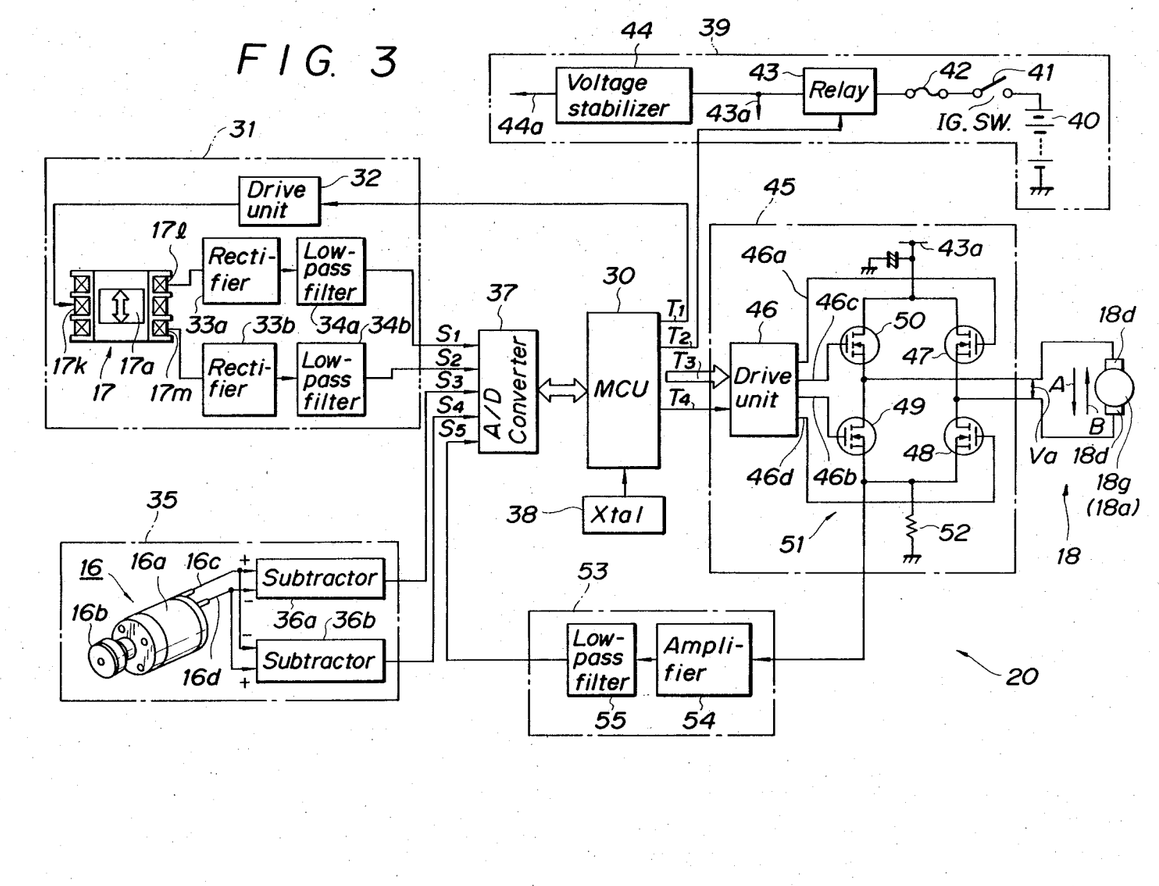
FIG. 3 is a diagram showing in detail a control circuit of the electromagnetic servo device.

More particularly, in the case where, exemplarily under such a condition that steering torque is applied to the input shaft 4 in the clockwise direction when viewed at the side of the steering wheel 6 while a larger load than the steering torque is imposed on the output shaft 5, the input shaft 4 is thus rotated relative to the output shaft 5 in the clockwise direction when viewed at the side of the steering wheel 6, then the mobile ferrous member 17a is caused to move rightwardly in FIG. 1 and FIG. 2B, that is, upwardly in FIG. 2C as well as in FIG. 3 that will be described later.

To the contrary, in the case where the input shaft 4 is rotated relative to the output shaft 5 in the counterclockwise direction when viewed at the side of the steering wheel 6, then the ferrous member 17a is caused to move in the opposite direction to the above.

In either of the foregoing cases, since the inclined elongate holes 17g of the mobile ferrous member 17a, which are engaged with the pins 17e provided at the side of the output shaft 5, are so shaped as to have a straight-linear form when the ferrous member 17a of a tubular form is developed, the member 17a has an axial displacement in the moving direction from an original middle position thereof in proportion to the circumferential relative angular difference between the input and output shafts 4, 5.

In this respect, the mobile ferrous member 17a is adapted to be located at the middle position under the condition that no steering torque is acting on the input shaft 4 and hence the circumferential relative angular difference between the input and output shafts 4, 5 is zero. In the state shown in FIGS. 1 and 2A to 2C, the ferrous member 17a is located at such middle position.

Incidentally, due to an engagement relation between the projections 5b of the output shaft 5 and the slots 4c of the input shaft 4, the circumferential relative angular difference between the shafts 4, 5 is controlled so as not to exceed a predetermined value. Namely, when, with a steering operation causing the input shaft 4 to rotate, the circumferential relative angular difference between the input and output shafts 4, 5 is increased to the predetermined value one side face of each of the projections 5b is brought into abutment with one side face of corresponding one of the slots 4c and, thereafter, the output shaft 5 is caused to integrally rotate with the input shaft 4. Such engagement relation between the projections 5b and the slots 4c plays a roll of a fail-safe mechanism of the electromagnetic servo device 1. In this respect, it will be understood that, under the condition that the driving of the electric motor 18 is stopped as will be described later, by functions of the fail-safe mechanism and the torsion bar 12 the electric power steering system 200 is adapted for manual steering operations to be performed without assist power.

The electric motor 18 comprises the aforementioned stator 3 which is integrally joined to the steering column 2, at least one pair of magnets 3a secured to the inner circumference of the stator 3, a rotor 18a rotatably arranged around the output shaft 5, and a pair of brushes 18d adapted, in brush holders 18b fixed to the stator 3, to be radially inwardly pushed with springs 18c. The rotor 18a includes a tubular shaft 18e rotatably supported with respect to the stator 3, by means of a bearing 21 and the reduction gear 19 of a planetary friction roller type. The tubular shaft 18e is arranged coaxial with the output shaft 5, and has integrally fixed on the outer circumference thereof a laminated ferrous core 18f formed with skew slots and multiple windings 18g laid thereon, with a predetermined fine air gap left between the inner circumferences of the magnets 3a and the outer circumferences of the windings 18g. Moreover, the tubular shaft 18e has fixed thereon a commutator 18h circumferentially equi-angularly divided into a plurality of segments to be connected to terminals 18i of the windings 18g, respectively, against which commutator 18h the brushes 18d are elastically pushed to be kept in contact therewith.

The reduction gear 19 is arranged around the tubular shaft 18e and the output shaft 5, to be coaxial with both of them. In the reduction gear 19, the tubular shaft 18e of the electric motor 18 has formed, in the outer circumference of an output end part thereof, three annular grooves V-shaped in section and axially spaced apart from each other, thereby constituting a sun roller 19a. Moreover, on the inner circumference of the stator 3, in correspondence to the sun roller 19a there is provided a ring roller 19b having along the inner circumference thereof three annular grooves defined to be of a V-form in section, which roller 19b is divided by these annular grooves into four segments in the axial direction and thus permitted to be axially openingly extended. Further, between the sun roller 19a and the ring roller 19b there are interposed at least two sets of planetary rollers 19c shaped along the outer circumferences thereof into an inverted V form in section, respectively, which rollers 19c are respectively fitted in the respective annular grooves of the sun and ring rollers 19a, 19b. The planetary rollers 19c are rotatably supported by shafts 19f projecting from a carrier member 19d secured in a splined manner to the output shaft 5. With such implementations and an additional facilitation including a hollow bolt 19e, which is screwed to the stator 3 and when tightened causes the four-segmented ring roller 19b and the planetary rollers 19c to be pushed together, there is achieved a constitution permitting intended transmission of torque. As will be understood, the rotation of the electric motor 18 is transmitted through the reduction gear 19, where it is reduced in speed, to the output shaft 5.

Next, with reference to FIG. 3, description will be made of the control circuit 20.

In FIG. 3, designated at reference numeral 30 is a microcomputer unit. To the microcomputer unit 30, in accordance with commands therefrom, respective detection signals $S_1$ to $S_5$ of a steering torque detection circuit 31, a steering rotation speed detection circuit 35, and an abnormality detection circuit 52 are input through an A/D converter 37.

The steering torque detection circuit 31 comprises the aforementioned steering torque sensor 17, a drive unit 32 through which a clock pulse $T_1$ generated in the microcomputer unit 30 is divided at a number of stages and amplified to be output in the form of an alternating-current signal of a rectangular or sinusoidal wave to the primary coil 17k of the steering torque sensor 17, a pair of rectifiers 33a, 33b for rectifying the respective electric signals output from the secondary coils 17l, 17m of the torque sensor 17 in accordance with the axial displacement of the mobile ferrous member 17a, and a pair of low-pass filters 34a, 34b for eliminating high-frequency components from respective output signals of the rectifiers 33a, 33b to thereby convert these output signals into stable direct-current voltage signals as the signals $S_1$, $S_2$.

The steering speed detection circuit 35 comprises the direct-current generator 16a of the steering speed sensor 16, the generator 16a having a pair of terminals 16c, 16d for outputting the aforementioned signals therefrom, and a pair of subtractors 36a, 36b for subtracting respective values of these output signals from each other to obtain a pair of steering speed signals to be output as the signals $S_3$, $S_4$.

The microcomputer unit 30 comprises such necessary parts (unshown) as an I/O port, a memory, an operator, a controller, and a clock generator to which a clock pulse of a crystal oscillator 38 is input.

For driving the microcomputer unit 30 as well as other circuits, there is provided an electric power circuit 39 comprising a normally-closed relay 43 which is installed in a power line led out from a positive terminal of a vehicle-mounted battery 40 through an ignition switch 41 and a fuse 42, and a voltage stabilizer 44 to which the relay 43 is connected at the output side thereof. At the output side of the relay 43 there is provided a terminal 43a for applying battery power to a later-described motor drive circuit 45, and from an output terminal 44a of the voltage stabilizer 44 constant-voltage power is applied to the microcomputer unit 30 and the respective detection circuits 31, 35, 52. Thus, while the ignition switch 41 is turned on, the microcomputer unit 30 is put in an energized state thereof, where it is permitted to process the respective input signals $S_1$ to $S_5$ from the detection circuits 31, 35, 52, following a program stored in the memory, to output control signals $T_3$, $T_4$ to be used for driving the electric motor 18 to the motor drive circuit 45, to thereby control the driving of the motor 18. In those control signals, $T_3$ is a direction of rotation representative signal responsible for determining the terminal polarity of an armature voltage Va to be impressed to the electric motor 18 in correspondence to the steering direction, and $T_4$ is a signal responsible for determination of magnitude of the armature voltage Va.

The motor drive circuit 45 comprises a drive unit 46, and a bridge circuit 51 consisting of four FET's (field effect transistors) 47, 48, 49, 50, in which two FET's 47, 50 constituting two neighboring sides of the bridge have respective drain terminals thereof connected to the output terminal 43a of the relay 43 of the power circuit 39 and source terminals thereof connected to drain terminals of the remaining two FET's 48, 49, respectively, while respective source terminals of these FET's 48, 49 are connected through a resistor 52 to the earth as common side and thus to a negative terminal of the battery 40. Moreover, the FET's 47, 48, 49, 50 have gate terminals thereof connected to output terminals 46a, 46b, 46c, 46d of the drive unit 46, respectively, and the respective source terminals of the FET's 47, 50 are connected as output terminals of the bridge circuit 51 to the brushes 18d of the electric motor 18, which in turn are connected to the armature windings 18g.

The drive unit 46 is adapted to output a signal from the terminal 46a or 46c for exclusively driving to turn on the FET 47 or 50 in accordance with the signal $T_3$ sent as a motor rotation direction control signal from the microcomputer unit 30 and, concurrently, to output a signal from the terminal 46b or 46d for exclusively bringing the FET 49 or 48 into a drivable state thereof, to thereby control the driving of the electric motor 18. In the case of the signal from the terminal 46b or 46d, a frequency-constant rectangular pulse signal of a battery level is modulated in pulse duration, to be exclusively output to the gate of the FET 49 or 48, in accordance with the signal $T_4$ as a motor voltage control signal.

In the motor drive circuit 45, therefore, in accordance with the control signals $T_3$, $T_4$, one 47 of the two FET's 47, 50 and the FET 49 cooperating therewith are driven to be turned on and to be controlled in a PWM manner, respectively, or likewise the other FET 50 and the FET 48 cooperating therewith are on-driven or PWM-driven, respectively, to thereby control the direction of rotation and output power (number of revolutions and torque) of the electric motor 18.

In this respect, for example, in the case the FET's 47 and 49 are driven as described above, the armature voltage Va has a magnitude proportional to the pulse duration of the pulse signal output from the terminal 46b of the drive unit 46 and such a polarity that conducts an armature current Ia in a direction B causing the electric motor 18 to rotate clockwise. To the contrary, in the case the FET's 50 and 48 are driven, the magnitude of the armature voltage Va is in proportion to the pulse duration of the pulse signal output from the terminal 46d of the drive unit 46 and the polarity thereof is so determined as to conduct the armature current Ia in a direction A causing the electric motor to rotate counterclockwise.

As described, in the present embodiment of the invention, there is employed the abnormality detection circuit 53, which is adapted for detecting abnormalities of the motor drive circuit 45 and the electric motor 18. The abnormality detection circuit 53 comprises an amplifier 54 for amplifying the terminal voltage of the resistor 52 that corresponds to the magnitude of the armature current Ia, and a low-pass filter 55 for eliminating high-frequency components from an output signal of the amplifier 54 to thereby convert this output signal into a direct-current voltage; and an output signal as the control signal $S_5$ from the abnormality detection circuit 53 is fed back through the A/D converter 37 to the microcomputer unit 30. In this respect, this detection circuit 53 is adapted to detect abnormalities of the electric motor 33 as well as of the motor drive circuit 45 by checking the terminal voltage of the resistor 52. In cases where an abnormality is detected by the circuit 53, the microcomputer unit 30 enters an abnormality diagnosis process, where it functions so as to output a relay control signal $T_2$ to the relay 43 of the power circuit 39 to thereby interrupt the power supply of the relay 43 to circuit elements.

There will be described below various programmed functions of the microcomputer unit 30.

Figure 4A:
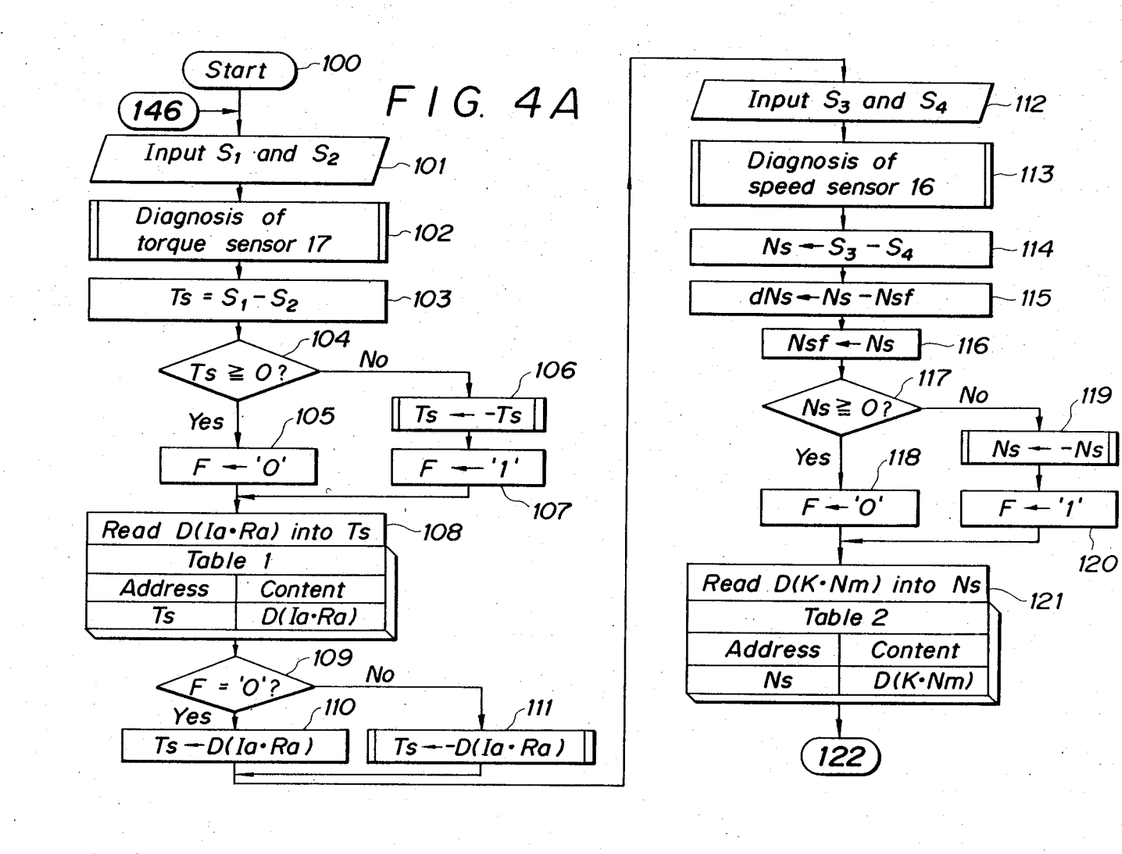
FIGS. 4A and 4B are schematic flowcharts of control processes to be executed by a microcomputer unit in the control circuit of FIG. 3.
Figure 4B:
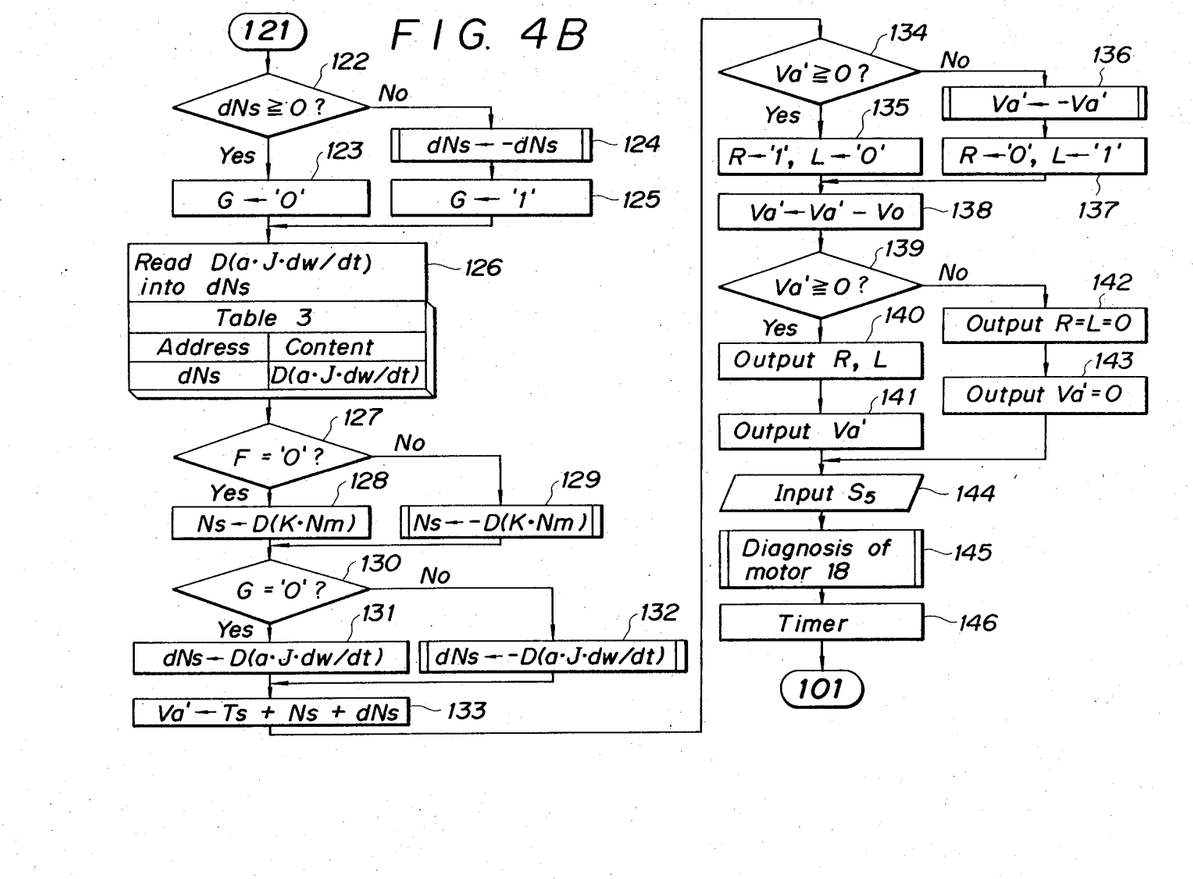

FIGS. 4A and 4B are flowcharts showing the outline of control processes to be executed at the microcomputer unit 30. In those Figures, designated at reference numerals 100 to 146 are associated process stages.

By turning on the ignition switch 41, the microcomputer unit 30 as well as other associated circuits is applied with electric power and permitted to exhibit control functions thereof.

First, at stage 100, respective registers and data of a RAM as well as necessary circuits in the microcomputer unit 30 are initialized.

Next, at stage 101, the steering torque detection signals $S_1$, $S_2$ are read in turn and, at stage 102, there is made a diagnosis whether the read values are normal or not. If any abnormality is found, then the relay control signal $T_2$ is output from the microcomputer unit 30 to the relay 43, thereby interrupting the power supply from the power circuit 39, so that the driving of the electromagnetic servo device 1 stops, allowing manual steering operations to be performed without assist power.

Figure 5:
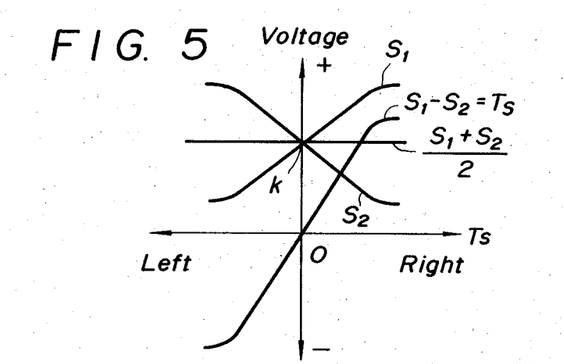
FIG. 5 is a graph showing characteristics of a steering torque detection signal.

In this respect, since the steering torque sensor 17 is constituted in the form of a differential transformer, if the detection circuit 31 is normal the detection signals $S_1$, $S_2$ have such relations to steering torque Ts as shown in FIG. 5, so that half of the sum of the signals $S_1$, $S_2$ becomes a substantially constant value k. Thus, at the stage 102, there is made a judgment whether or not the difference between $(S_1+S_2)/2$ and k is found within a predetermined range and, in the case it is not within the predetermined range, the steering torque detection circuit 31 is concluded to be out of order. In the case the steering torque detection signals $S_1$, $S_2$ as read are normal, the flow goes to stage 103. In this regard, because, as described in conjunction with FIG. 2A, side faces of the projections 5b of the output shaft 5 are brought into abutment with corresponding side faces of the grooves 4c of the input shaft 4, in those ranges in FIG. 5 in which steering torque Ts has exceeded a predetermined value in either of leftward and rightward directions the values of the detection signals $S_1$, $S_2$ are kept constant.

At the stage 103, there is made a calculation of $S_1-S_2$, letting the result be the value of steering torque Ts. In practical cases, however, to obtain one of continuous integers as the value of Ts, the result of $S_1-S_2$ may be multiplied by a predetermined numeral and then substituted for Ts. Like comment is applicable also to stage 114 that will be described later.

At stage 104, to discriminate the acting direction of steering torque Ts, there is made a judgment whether the value of Ts is positive or negative. And, if the acting direction of steering torque Ts is clockwise, that is, if the value thereof is positive or zero, the flow goes through stage 105, where a first flag F is made such that F='0', to stage 108. If the steering torque Ts has a negative value, the flow goes through stage 106, where a convertion process is executed to make the steering torque Ts an absolute value such that Ts=−Ts, to stage 107 for making the first flag F such that F='1' and in turn to stage 108, where the first flag F is used as a parameter representing the sign of the value of steering torque Ts, that is, the acting direction thereof.

Figure 6:
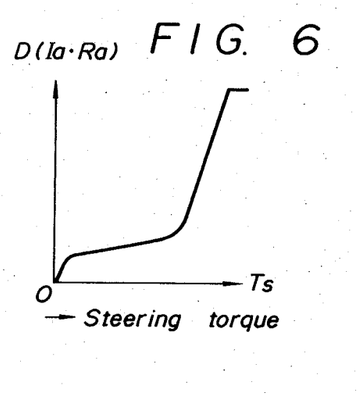
FIG. 6 is a graph showing a steering torque attributed component of a duty value.

At the stage 108, in dependence on the absolute value of steering torque Ts, a content of a table 1 in a ROM (not shown) is directly read in an address designation manner. In the ROM, there is written in advance the table 1 in which duty values D(Ia·Ra) of Ia·Ra having such a relation to the absolute value of steering torque Ts as shown in FIG. 6 are stored, where Ia is the armature current of the electric motor 18 and Ra is the sum of resistances such as of armature windings, brushes, and wiring. Namely, at the stage 108, such content of memory that has an address represented by the absolute value of steering torque Ts, that is, a duty value D(Ia·Ra) of Ia·Ra is read; thereafter, the flow goes to stage 109.

At the stage 109, to give a sign corresponding to the direction of steering torque Ts to the steering torque attributed duty value D(Ia·Ra), a judgment is made of the content that the first flag F then has. If F='0', the acting direction of steering torque Ts is clockwise and hence the flow goes to stage 110, where the duty value D(Ia·Ra) of Ia·Ra is stored as Ts, as it is. To the contrary, if F='1', the acting direction of steering torque Ts is counterclockwise and hence the flow goes to stage 111, where the duty value D(Ia·Ra) of Ia·Ra is stored as a negative value; thereafter, the flow goes to stage 112. Incidentally, it will be understood that, though practically unnecessary, the stage 110 is shown for easier comprehension of the flow. Like comment is applicable also to later-described stages 128, 131.

At the stage 112, the detection signals $S_3$, $S_4$ from the steering speed detection circuit 35 are read in turn and, at stage 113, there is made a diagnosis whether thus read values are normal or not. If any abnormality is found, then the relay control signal $T_2$ is output from the microcomputer unit 30 to the relay 43, thereby interrupting the power supply from the power circuit 39, so that the driving of the electromagnetic servo device 1 stops, allowing manual steering operations to be performed without assit power.

Figure 7:
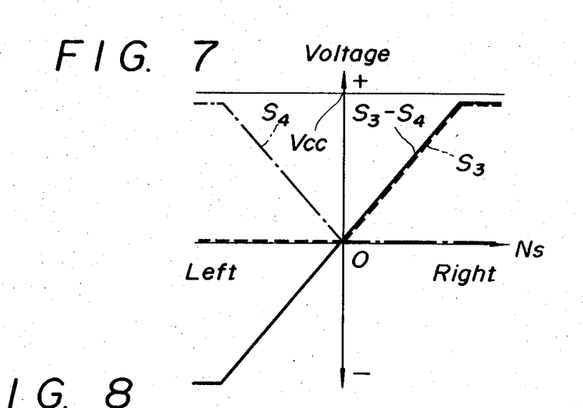
FIG. 7 is a graph showing characteristics of a steering speed detection signal.

In this respect, if the detection circuit 35 is normal, the detection signals $S_3$, $S_4$ thereof have such relations to steering speed Ns as shown in FIG. 7. Thus, in a case where respective direct-current voltage values of the detection signals $S_3$, $S_4$ are both positive and in a case where either the detection signal $S_3$ or $S_4$ has become substantially equal to voltage Vcc of the voltage stabilizer 44, the steering speed detection circuit 35 is judged to be abnormal. In this concern, the generator 16a has such a characteristic that renders the expectable maximum output lower than Vcc by a predetermined value.

In the case the detection signals $S_3$, $S_4$ as read at the stage 112 are judged normal at the stage 113, the flow goes to stage 114, where a calculation of $S_3 - S_4$ is made, letting the result be the value of steering speed Ns.

Next, at stage 115, there is executed an operation process of Ns−Nsf and the result is stored as the value of steering acceleration dNs, where Nsf is the steering speed of the last time and has an initial value initialized to zero at the stage 100.

Then, at stage 116, Ns is transferred to Nsf; thereafter, the flow goes to stage 117.

At the stage 117, to discriminate the direction of steering velocity, there is made a judgment whether the value of Ns is positive or negative. And, if the steering speed is of clockwise rotation, that is, if Ns is positive or zero, the flow goes to stage 118, where the first flag F is made such that F='0'. If the steering speed is of counterclockwise rotation, that is, if Ns is negative, the flow goes through stage 119, where a convertion process is executed to make the steering speed Ns an absolute value such that Ns= −Ns, to stage 120 for making the first flag F such that F='1'; thereafter, the flow goes to stage 121.

Figure 8:
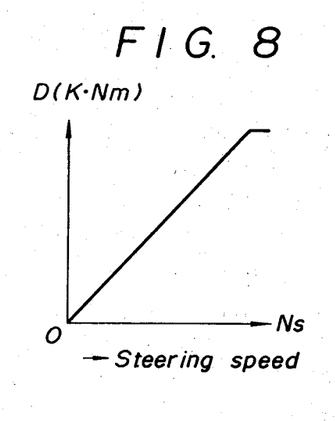
FIG. 8 is a graph showing a steering speed attributed component of the duty value.

At the stage 121, in dependence on the absolute value of steering speed Ns, a content of a table 2 in the ROM is directly read in an address designation manner. In the ROM, there is written in advance the table 2 in which duty values D(K·Nm) of induction voltages K·Nm having such a relation to the absolute value of steering speed Ns as shown in FIG. 8 are stored, where K is a constant of inductive electromotive force of the electric motor 18 and Nm is the speed of rotation of the motor 18. Namely, at the stage 121, such content of memory that has an address represented by the absolute value of steering speed Ns, that is, a duty value D(K·Nm) of K·Nm is read. In this concern, it will be understood that, since the rotation of the electric motor 18 is transmitted through the reduction gear 19 to the output shaft 5 and the reduction ratio of the reduction gear 19 is constant, the induction voltage K·Nm of the electric motor 18 depends on the steering speed Ns.

Thereafter, the flow goes to stage 122.

At the stage 122, to discriminate the direction of steering acceleration, there is made a judgment whether the value of dNs is positive or negative. And, if the the direction of steering acceleration is clockwise, that is, if dNs is positive or zero, the flow goes to stage 123, where a second flag G is made such that G='0'. If the direction of steering acceleration is counterclockwise, that is, if dNs is negative, the flow goes through stage 124, where a convertion process is executed to make the steering acceleration dNs an absolute value such that dNs= −dNs, to stage 125 for making the second flag G such that G='1'; thereafter, the flow goes to stage 126.

Figure 9:
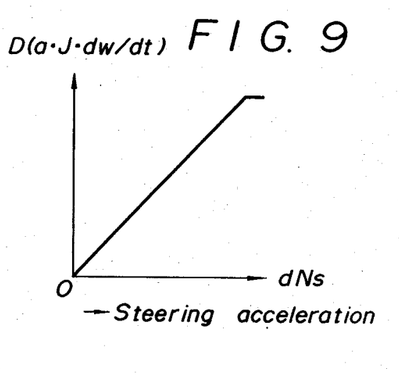
FIG. 9 is a graph showing a steering acceleration attributed component of the duty value.

At the stage 126, in dependence on the absolute value of steering acceleration dNs, a content of a table 3 in the ROM is directly read in an address designation manner. In the ROM, there is written in advance the table 3 in which duty values D(a·J·dw/dt) of inertial torque a·J·dw/dt of rotary members of the electromagnetic servo device 1 having such a relation to the absolute value of steering acceleration dNs as shown in FIG. 9 are stored, where J is the sum of the respective moments of inertia of the rotor 18a of the electric motor 18, the reduction gear 19, and other rotary members and dw/dt is the angular acceleration of such rotary members, while a is a constant of proportion. Namely, at the stage 126, such content of memory that has an address represented by the absolute value of steering acceleration dNs, that is, a duty value D(a·J·dw/dt) of the inertial torque a·J·dw/dt of the rotary members is read; thereafter, the flow goes to stage 127.

At the stage 127, to give a sign corresponding to the direction of steering velocity to the steering speed attributed duty value D(K·Nm), a judgment is made of the content that the first flag F then has. If F='0', the steering speed Ns is of clockwise rotation and hence the flow goes to stage 128, where the duty value D(K·Nm) attributed to the steering speed Ns is stored as Ns, as it is. To the contrary, if F='1', the steering speed Ns is of counterclockwise rotation and hence the flow goes to stage 129, where the duty value D(K·Nm) attributed to the steering speed Ns is stored as a negative value; thereafter, the flow goes to stage 130.

At the stage 130, to give a sign corresponding to the direction of steering acceleration dNs to the steering acceleration attributed duty value D(a·J·dw/dt), a judgment is made of the content that the second flag G F then has. If G='0', the direction of steering acceleration dNs is clockwise and hence the flow goes to stage 131, where the duty value D(a·J·dw/dt) attributed to the steering acceleration dNs is stored as dNs, as it is. To the contrary, if G='1', the direction of steering acceleration dNs is counterclockwise and hence the flow goes to stage 132, where the duty value D(a·J·dw/dt) attributed to the steering acceleration dNs is stored as a negative value; thereafter, the flow goes to stage 133.

At the stage 133, thus determined duty value components, that is, the steering torque attributed duty value D(Ia·Ra), the steering speed attributed duty value D(K·Nm), and the steering acceleration attributed duty value D(a·J·dw/dt) are added to obtain a duty value Va' of the armature voltage Va to be impressed to the electric motor and the duty value Va' is stored. In this concern, strictly speaking, the value Va' above is a duty value of the pulse signal to be output from the drive unit 46 to the FET 48 or 49.

Next, at stage 134, to discriminate the polarity of armature voltage Va, there is made a judgment of the sign of thus obtained Va'. If Va' is positive or zero, the flow goes to stage 135, where respective values of a pair of flags R, L constituting the basis of the motor drive direction signal $T_3$ are determined such that R='1' and L='0'. To the contrary, if the value of Va' is negative, the flow goes through stage 136, where Va' is multiplied by −1 and thereby converted into a positive value, to stage 137 for determining the values of the flags R, L such that R='0' and L='1'; thereafter, the flow goes to stage 138.

At the stage 138, to establish a dead zone for the duty value Va' which is now given in the form of an absolute value as described above, a value Va'−V₀ obtained by subtracting a predetermined value V₀ from Va' is stored as Va'; thereafter, the flow goes to stage 139. As will be understood, in some cases, the value of Va' may become negative after the process at the stage 138. For example, under such a condition that the steering wheel 6 is kept at a neutral position thereof without steering torque applied thereto, Va' becomes a negative value such that Va'=−V₀, after the process at the stage 138.

At the stage 139, there is made a judgment whether or not the value of Va' is larger than zero and, in the case it is larger, the flow goes to stage 140, where the respective values of the flags R, L are output, as they are, as components of the direction signal $T_3$, and in turn to stage 141, where Va' is output as a component of the motor voltage signal $T_4$. To the contrary, if Va' is zero or smaller, the flow goes through stage 142, where such values of R and L that R=L='0' are output as components of the direction signal $T_3$, to stage 143, where Va'=0 is output. In this respect, the drive unit 46 of the motor drive circuit 45 is adapted to output the signals from the terminals 46a to 46d, as necessary, so as to turn on the FET 47 and bring the FET 49 into a drivable state thereof, in the case R='1' and L='0', and to turn on the FET 50 and bring the FET 48 into a drivable state thereof, in the case R='0' and L='1', to thereby control the polarity and magnitude of the armature voltage Va of the electric motor 18. And, the duty value Va' for determining the magnitude of the armature voltage Va to be impressed from the bridge circuit 51 to the electric motor 18 is output as a component of the control signal $T_4$ from the microcomputer unit 30. For example, in the case the direction control signal $T_3$ has such components that R='1' and L='0', the FET 49 is PWM-driven in dependence on Va'. To the contrary, in the case the direction control signal $T_3$ has such components that R='0' and L='1', the FET 48 is PWM-driven in dependence on Va'.

Next, at stage 144, the signal $S_5$ which corresponds to the armature current Ia of the electric motor 18 to be driven in dependence on the signals $T_3$, $T_4$ is read from the detection circuit 53.

Then, at stage 145, by subtracting the value of Ts determined at the stage 108 from the value of $S_5$, there is made a judgment whether or not the difference thus obtained is found within a predetermined permissible range. If it is not within the permissible range, judging that any of the FET's 47 to 49, the electric motor 18, or any of other circuits should be out of order, the relay control signal $T_2$ is output from the microcomputer 30 to the relay 43, thereby interrupting the power supply of the power circuit 39 to respective circuits. In the case the difference between $S_5$ and Ts is within the permissible range, the flow goes to stage 146, where a predetermined time interval, 1 msec for example, is elapsed. Thereafter, the flow goes to the stage 101.

In the procedure above, since at the stages 108, 121, and 126, where the duty value D(Ia·Ra) attributed to steering torque Ts, the duty value D(K·Nm) attributed to steering speed Ns, and the duty value D(a·J·dw/dt) attributed to steering acceleration dNs are determined, respectively, the determination of these duty values is directly made in an address designation manner without complicated computation processes, the necessary time for the flow to go around the stages 101 to 146 is substantially constant. Such necessary time can be determined in advance in correspondence to the consistution of the microcomputer unit 30, and may well be equal to factor dt in the duty value D(a·J·dw/dt) of the inertial torque a·J·dw/dt of rotary members of the electromagnetic servo device 1 that was described in conjunction with FIG. 9.

Incidentally, it will be understood that, since through the stages 117 to 121 the steering speed attributed duty value D(K·Nm) is determined in an address designation manner in dependence on the absolute value of steering speed Ns and through the stages 127 to 129 a sign corresponding to the direction of steering velocity is attached to the duty value D(K·Nm), it also is possible to execute the processes of the stages 127 to 129 just after the stage 121.

According to such control processes as described of the stages 101 to 146, the magnitude of the armature voltage Va to be impressed to the electric motor 18 is anytime determined, taking into consideration the steering speed Ns and the steering acceleration dNs as well as the steering torque Ts. Namely, in cases where the steering wheel 6 is steered in either direction, the value of the armature voltage Va is determined in consideration of the induction voltage K·Nm of the electric motor 18 that corresponds to an increase or decrease of the steering speed Ns and the inertial torque a·J·dw/dt of rotary members that corresponds to an increase or decrease of the steering acceleration dNs. Accordingly, those effects on steering operations which otherwise would be caused due to the moment of inertia, that is, inertial torque of rotary members, particularly in the electric power steering system 200, are possibly minimized, thus possibly improving the steering feeling.

FIG. 11 is a diagram in which various functions of the control circuit 20 are schematically represented by blocks, by showing interrelations between such essential elements of the circuit 20 that are shown in FIG. 3 and associated process stages in the process flow of FIGS. 4A and 4B, whereas in the Figure omissions are made such as of the detection signal $S_5$ and the control signals $T_1$, $T_2$.

As described, according to the present invention, since the magnitude of an armature voltage Va is always determined, taking into consideration the steering speed Ns and the steering acceleration dNs in addition to steering torque Ts, those effects on steering operations which otherwise would be caused due to the moment of inertia, that is, inertial torque of rotary members, particularly in such an electric power steering systems as the system 200, are possibly minimized, thereby possibly improving the steering feeling.

Incidentally, in the system 200 according to the embodiment above, the steering acceleration dNs is determined in dependence on the steering speed Ns that is determined from the signals $S_3$, $S_4$ output from the steering speed detection circuit 35. In this respect, however, such steering acceleration may preferably be determined by means of a circuit independently provided for detecting the steering acceleration.

Moreover, in the control circuit 20, instead of the microcomputer unit 30 there may be employed such a circuitry that has compatible functions.

Finally, in the embodiment above, though employing the control circuit 20 including the microcomputer unit 30 as a control device of the entirety of the steering system 200, the duty value Va' for determining the armature voltage Va is determined from the signals $S_1$, $S_2$, $S_3$, and $S_4$, fundamentally in an address designation manner, whereby the electric motor 18 is permitted to be so controlled as to sufficiently follow up the steering speed Ns.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

I claim:

1. An electric power steering system (200) for vehicles, comprising:
   an input shaft (4) operatively connected to a steering wheel (6);
   an output shaft (5) operatively connected to a steered wheel;
   an electric motor (18) for operatively supplying auxiliary torque to said output shaft (5);
   torque detecting means (31) for detecting steering torque (Ts) acting on said input shaft (4); and
   drive control means (30, 45, 53) for giving said electric motor (18) a drive signal (Va), taking into consideration an output signal ($S_1$, $S_2$) from said torque detecting means (31),
   wherein:
   said steering system (200) further comprises:
   means (35) for detecting the steering speed (Ns) of said input shaft (4); and
   means (115, 116, 122–126, 130–132) for detecting the steering acceleration (dNs) of said input shaft (4); and
   said drive control means (30, 45, 53) is adapted to give said motor drive signal (Va) to said electric motor (18), taking into consideration an output signal ($S_3$, $S_4$) from said steering speed detecting means (35) and an output signal (dNs) from said steering acceleration detecting means (115, 116, 122–126, 130–132) in addition to said steering torque signal ($S_1$, $S_2$).

2. An electric power steering system for vehicles according to claim 1, wherein:
   said drive control means (30, 45, 53) comprises:
   a microcomputer unit (30) which, receiving said output signal ($S_1$, $S_2$) from said steering torque detecting means (31), said output signal ($S_3$, $S_4$) from said steering speed detecting means (35), and said output signal (dNs) from said steering acceleration detecting means (115, 116, 122–126, 130–132), determines and outputs a motor control signal ($T_3$, $T_4$) representing the content of said drive signal (Va) to be given to said electric motor (18); and
   motor drive means (45) which, receiving said motor control signal ($T_3$, $T_4$), gives said motor drive signal (Va) to said electric motor (18) in dependence on said motor control signal ($T_3$, $T_4$); and
   said microcomputer unit (30) is adapted to determine said motor control signal ($T_3$, $T_4$) in an address designation manner in dependence on respective said output signals ($S_1$, $S_2$, $S_3$, $S_4$ and dNs) from respective said detecting means (31, 35, and 115, 116, 122–126, 130–132).

3. An electric power steering system for vehicles according to claim 2, wherein:
   said motor drive signal (Va) to be given from said motor drive means (45) to said electric motor (18) is an armature voltage signal (Va);
   said motor drive means (45) comprises a drive circuit (45) for impressing said armature voltage signal (Va) as a PWM signal to said electric motor (18);
   said microcomputer unit (30) is adapted to determine:
   in dependence on said steering torque signal ($S_1$, $S_2$) in an address designation manner a duty value [D(Ia·Ra)] attributed to said steering torque (Ts);
   in dependence on said steering speed signal ($S_3$, $S_4$) in an address designation manner a duty value [D(K·Nm)] attributed to said steering speed (Ns); and
   in dependence on said steering acceleration signal (dNs) in an address designation manner a duty value [(a·J·dw/dt)] attributed to said steering acceleration (dNs); and
   said microcomputer unit (30) is further adapted for outputting to said drive circuit (45) said motor control signal ($T_3$, $T_4$) having as a component thereof the sum of respective said duty values [D(Ia·Ra), D(K·Nm), D(a·J·dw/dt)].

4. An electric power steering system for vehicles according to claim 1, wherein:
   said output signal (dNs) from said steering acceleration detecting means (115, 116, 122–126, 130–132) is determined by said drive control means (30, 45) in dependence on said output signal ($S_3$, $S_4$) from said steering speed detecting means (35).

5. An electric power steering system for vehicles according to claim 1, wherein:
   said drive control means (30, 45, 53) comprises:
   a control circuit (30) which, receiving said output signal ($S_1$, $S_2$) from said steering torque detecting means (31), said output signal ($S_3$, $S_4$) from said steering speed detecting means (35), and said output signal (dNs) from said steering acceleration detecting means (115, 116, 122–126, 130–132), determines and outputs a motor control signal ($T_3$, $T_4$) representing the content of said drive signal (Va) to be given to said electric motor (18); and
   a motor drive circuit (45) which, receiving said motor control signal ($T_3$, $T_4$), gives said motor drive signal (Va) to said electric motor (18) in dependence on said motor control signal ($T_3$, $T_4$); and said control circuit (30) is adapted to determine said motor control signal ($T_3$, $T_4$) in dependence on respective said output signals ($S_1$, $S_2$, $S_3$, $S_4$ and dNs) from respective said detecting means (31, 35, and 115, 116, 122–126, 130–132).

6. An electric power steering system for vehicles according to claim 5, wherein:
   said motor drive signal (Va) to be given from said motor drive circuit (45) to said electric motor (18) is an armature voltage signal (Va);
   said motor drive circuit (45) is adapted for impressing said armature voltage signal (Va) as a PWM signal to said electric motor (18);
   said control circuit (30) is adapted to determine:
   in dependence on said steering torque signal ($S_1$, $S_2$) a duty value [D(Ia·Ra)] attributed to said steering torque (Ts);

in dependence on said steering speed signal ($S_3$, $S_4$) a duty value [D(K·Nm)] attributed to said steering speed (Ns); and in dependence on said steering acceleration signal (dNs) a duty value [(a·J·dw/dt)] attributed to said steering acceleration (dNs); and said control circuit (30) is further adapted for outputting to said drive circuit (45) said motor control signal ($T_3$, $T_4$) having as a component thereof the sum of respective said duty values [D(Ia·Ra), D(K·Nm), D(a·J·dw/dt)].

7. An electric power steering system for vehicles according to claim 1, wherein:

said motor drive signal (Va) to be given from said motor drive means (30, 45, 53) to said electric motor (18) is an armature voltage signal (Va); and said drive control means (30, 45, 53) includes feedback signal generating means (53) which, detecting an armature current (Ia) of said electric motor (18), gives an output signal ($S_5$) therefrom to said drive control means (30, 45, 53).

8. An electric power steering system for vehicles according to claim 1, further comprising:

a speed reduction mechanism (19) for transmitting torque generated by said electric motor (18) to said output shaft (5) in a speed reducing manner.

* * * * *